United States Patent
Chaudhary et al.

(10) Patent No.: US 12,229,231 B2
(45) Date of Patent: *Feb. 18, 2025

(54) GENERATION OF AUTHENTICATION QUESTIONS BASED ON USER-CREATED TRANSACTION LIMITATIONS

(71) Applicant: Capital One Services, LLC, McLean, VA (US)

(72) Inventors: Viraj Chaudhary, Katy, TX (US); David Septimus, New York, NY (US); Jenny Melendez, Falls Church, VA (US); Samuel Rapowitz, Roswell, GA (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,802

(22) Filed: Jan. 9, 2024

(65) Prior Publication Data
US 2024/0143710 A1 May 2, 2024

Related U.S. Application Data

(63) Continuation of application No. 17/314,683, filed on May 7, 2021, now Pat. No. 11,907,343.

(51) Int. Cl.
*G06F 21/31* (2013.01)
*G06F 16/2455* (2019.01)
(Continued)

(52) U.S. Cl.
CPC ........ *G06F 21/31* (2013.01); *G06F 16/24564* (2019.01); *G06F 21/604* (2013.01);
(Continued)

(58) Field of Classification Search
CPC ........ G06F 21/604; G06F 21/45; G06F 21/31; G06F 21/316; G06F 21/30; G06F 21/62; G06F 21/6245
See application file for complete search history.

(56) References Cited

U.S. PATENT DOCUMENTS 9,813,402 B1  11/2017 Chen et al.
2010/0312704 A1  12/2010 Rohatgi
(Continued)

OTHER PUBLICATIONS

Mar. 13, 2019, Kh, Is Machine Learning Solving User Authentication Challenges in App Development, <<https://datafloq.com/read/machine-learning-solving-user-authentication-apps.6152>>, 13 pages, printed May 6, 2021.

(Continued)

*Primary Examiner* — Edward Zee

(57) ABSTRACT

Methods, systems, and apparatuses are described herein for improving the accuracy of authentication questions using transaction limitations provided by users. A request for access to an account associated with a user may be received from a user device. An account restrictions database may be queried to determine one or more transaction rules associated with the account. The one or more transaction rules may have been created by the user and indicate limitations on financial transactions that may be performed via the account. An authentication question may be generated that is associated with a violation of the one or more transaction rules. The authentication question may be provided to the user device, and a response to the authentication question may be received. Access to the account may be provided to the user device based on the response.

20 Claims, 7 Drawing Sheets

(51) Int. Cl.
  *G06F 21/00*   (2013.01)
  *G06F 21/60*   (2013.01)
  *G06N 3/08*    (2023.01)
  *G06Q 40/02*   (2023.01)
(52) U.S. Cl.
  CPC ............ *G06N 3/08* (2013.01); *G06Q 40/02* (2013.01); *G06F 2221/2103* (2013.01)

(56) References Cited

U.S. PATENT DOCUMENTS

| | | | |
|---|---|---|---|
| 2013/0159185 A1* | 6/2013 | Lee | G06Q 20/4015 705/44 |
| 2015/0220926 A1 | 8/2015 | McLachlan et al. | |
| 2015/0339477 A1 | 11/2015 | Abrams et al. | |
| 2015/0371233 A1 | 12/2015 | Simakov et al. | |
| 2019/0377853 A1 | 12/2019 | Obaidi | |
| 2020/0065459 A1 | 2/2020 | Himabindu et al. | |
| 2020/0327589 A1 | 10/2020 | Greenberg et al. | |
| 2021/0004798 A1 | 1/2021 | Stark et al. | |
| 2021/0073371 A1 | 3/2021 | Semichev et al. | |

OTHER PUBLICATIONS

May 22, 2017, Woodecki, Product & Technology, Answers to Your Top 3 Questions About Adaptive Authentication—One Login, <<https://www.onelogin.com/blog/answers-to-your-top-3-questions-about-adaptive-authentication>>, 5 pages, printed May 6, 2021.

Madden, Idaptive is Taking Machine Learning for Authentication and Applying it to Authorization, 7 pages, <<https://searchsecurity.techtarget.com/opinion/Idaptive-is-taking-machine-learning-for-authentication-and-applying-it-to-authorization>>, printed May 6, 2021.

May 24, 2018, Steensen, Machine Learning in the Payments Industry, 34 pages, <<https://usa.visa.com/dam/VCOM/global/support-legal/documents/webinar-machine-learning.pdf>>, printed May 6, 2021.

Feb. 21, 2021, Chuprina, SPD Stories, Machine Learning, Credit Card Fraud Detection: Top ML Solutions in 2021, 23 pages, <<https:spd.group/machine-learning/credit-card-fraud-detection/>>, printed May 6, 2021.

Sep. 17, 2019, AI and ML in Finance, Use Cases in Banking, Insurance, Investment, AltexSoft, 10 pages, <<https://www.altexsoft.com/blog/datascience/machine-learning-use-cases-in-finance/>>, printed May 6, 2021.

Bani-Hane, et al., Online Authentication Methods Used in Banks and Attacks Against These Methods, Science Direct, 8 pages, <<https://www.sciencedirect.com/science/article/pii/S1877050919306167/pdf?md5=37f0659886e2c7da9c0802cb300dbf6b&pid=1-s2.0-S1877050919306167-main.pdf>>, printed May 6, 2021.

Jul. 21, 2022—(WO) International Search Report and Written Opinion—App No. PCT/US22/72153.

* cited by examiner

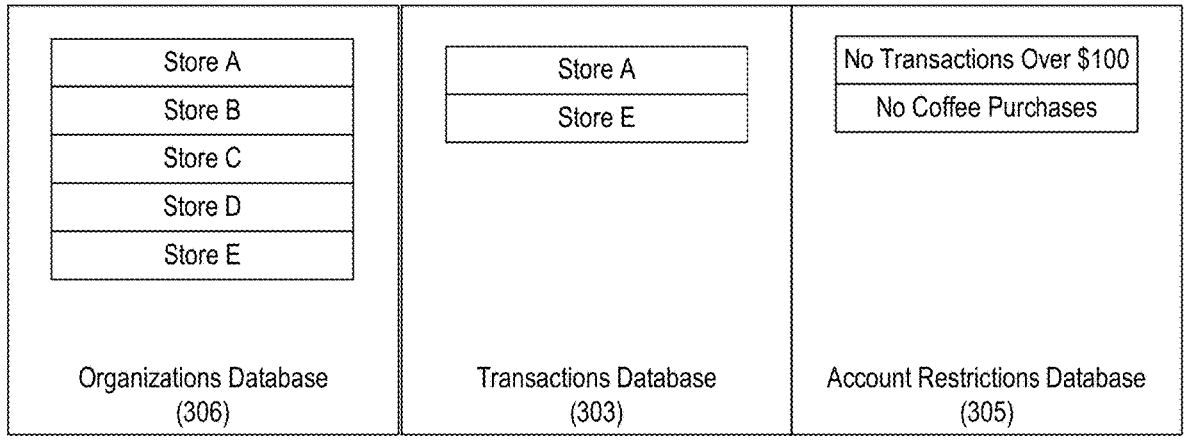
FIG. 6A
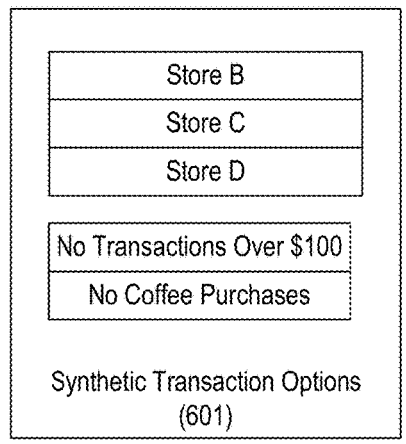
FIG. 6B
FIG. 6C

GENERATION OF AUTHENTICATION QUESTIONS BASED ON USER-CREATED TRANSACTION LIMITATIONS

CROSS REFERENCE TO RELATED APPLICATIONS

This application is a continuation of U.S. patent application Ser. No. 17/314,683, filed May 7, 2021, titled Generation of Authentication Questions Based on User-Created Transaction Limitations. The contents of the above listed application is expressly incorporated herein by reference in its entirety for any and all non-limiting purposes.

FIELD OF USE

Aspects of the disclosure relate generally to authentication of computing devices. More specifically, aspects of the disclosure may provide for enhanced authentication of computing devices using limitations, provided by a user, on financial transactions.

BACKGROUND

As part of determining whether to grant a user device access to content (e.g., a website containing personal information, such as banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who is your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user might be able to glean personal information about the legitimate user.

One issue with using real or synthetic financial transactions to generate authentication questions used to authenticate a user is that, in some instances, the answer to authentication questions might be guessed by a nefarious party. After all, it might be easy for an unauthorized user to guess that an account has or has not been used to conduct a particular type of transaction, particularly if the transaction is atypical for the account. For example, it might be easy to guess that a college student does not regularly spend thousands of dollars at high-end steakhouses, such that it is unlikely that their bank account would show a five-hundred-dollar purchase at a steakhouse. As another example, it might be easy to guess that the same college student regularly frequents a coffee shop, and that their credit card account might reflect numerous coffee shop purchases. It is thus desirable to generate authentication questions in a manner that can be easily answered by a legitimate user, but which cannot be easily guessed by a nefarious user.

Aspects described herein may address these and other problems, and generally improve the quality, efficiency, and speed of computer authentication systems by offering improved selection and generation of authentication questions using transaction limitations provided by users.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improved generation of authentication questions using generating synthetic transactions that indicate violations of transaction rules set by one or more users. This may have the effect of avoiding confusion and false rejections during an authentication process, improving the process of authentication overall. According to some aspects, these and other benefits may be achieved by receiving a request for access to an account associated with a user, then determining transaction rules established for that account. A synthetic (that is, fake) transaction might then be generated that indicates a violation of one or more of the transaction rules. An authentication question might be generated based on that synthetic transaction. For example, a user might be prompted to indicate whether or not they conducted a transaction that violates a transaction rule. In this manner, while a nefarious user might not necessarily know the answer to the authentication question, a legitimate user might readily identify that they did not conduct the synthetic transaction (as, after all, it violates one of their transaction rules).

More particularly, some aspects described herein may provide a computer-implemented method for generating an authentication question based on transaction limitations provided by a user. A computing device may receive, from a user device, a request for access to an account associated with a user. The computing device may query an account restrictions database to determine one or more transaction rules associated with the account. The one or more transaction rules may have been created by the user. The one or more transaction rules may indicate limitations on financial transactions that may be performed via the account. The computing device may then generate an authentication question associated with a violation of the one or more transaction rules. The computing device may provide the authentication question to the user device. The computing device may receive, from the user device, a response to the authentication question. The computing device may then provide, based on the response to the authentication question, the user device access to the account.

According to some embodiments, generating the authentication question may comprise providing, as input to a trained machine learning model, the one or more transaction rules, wherein the trained machine learning model is trained based on a plurality of transaction rules and a plurality of questions based on those rules; and receiving, as output from the trained machine learning model and based on the input, the authentication question. Querying the account restrictions database to determine the one or more transaction rules may comprise, based on determining that a quantity of the one or more transaction rules satisfy a threshold, providing, as input to a trained machine learning model, metadata corresponding to the account, wherein the trained machine learning model is trained based on a plurality of different accounts, and receiving, as output from the trained machine learning model and based on the input, one or more simulated transaction rules. Querying the account restrictions database to determine the one or more transaction rules may comprise providing, as input to a trained machine learning model, the one or more transaction rules, wherein the trained machine learning model is trained based on groups of transaction rules, and receiving, as output from the trained machine learning model and based on the input, additional transaction rules. Generating the authentication question may comprise querying, using metadata corresponding to the account, an accounts database to determine one or more second accounts similar to the account, wherein generating the authentication question is based on historical transactions associated with the one or more second account. The computing device may, based on determining that a quantity of the one or more transaction rules satisfy a threshold, process a transaction history of the account to determine a behavioral trend, and cause output of a recommendation to create a transaction rule based on the behavioral trend. Generating the authentication question may be based on a transaction history associated with the account. The one or more transaction rules may indicate one or more of: that the account is prohibited from conducting a transaction at a vendor; and that the account is prohibited from conducting a transaction during a time period. The request for access to the account associated with the user may comprise authentication credentials, and providing the user device access to the account may be further based on authenticating the authentication credentials.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6a shows illustrative data stored by an organizations database, a transactions database, and a transaction rules database;

FIG. 6b shows options for a synthetic transaction;

FIG. 6c shows a user interface that shows an authentication question that has been generated based on a synthetic transaction that violates a transaction rule.

DETAILED DESCRIPTION

Figure 1:
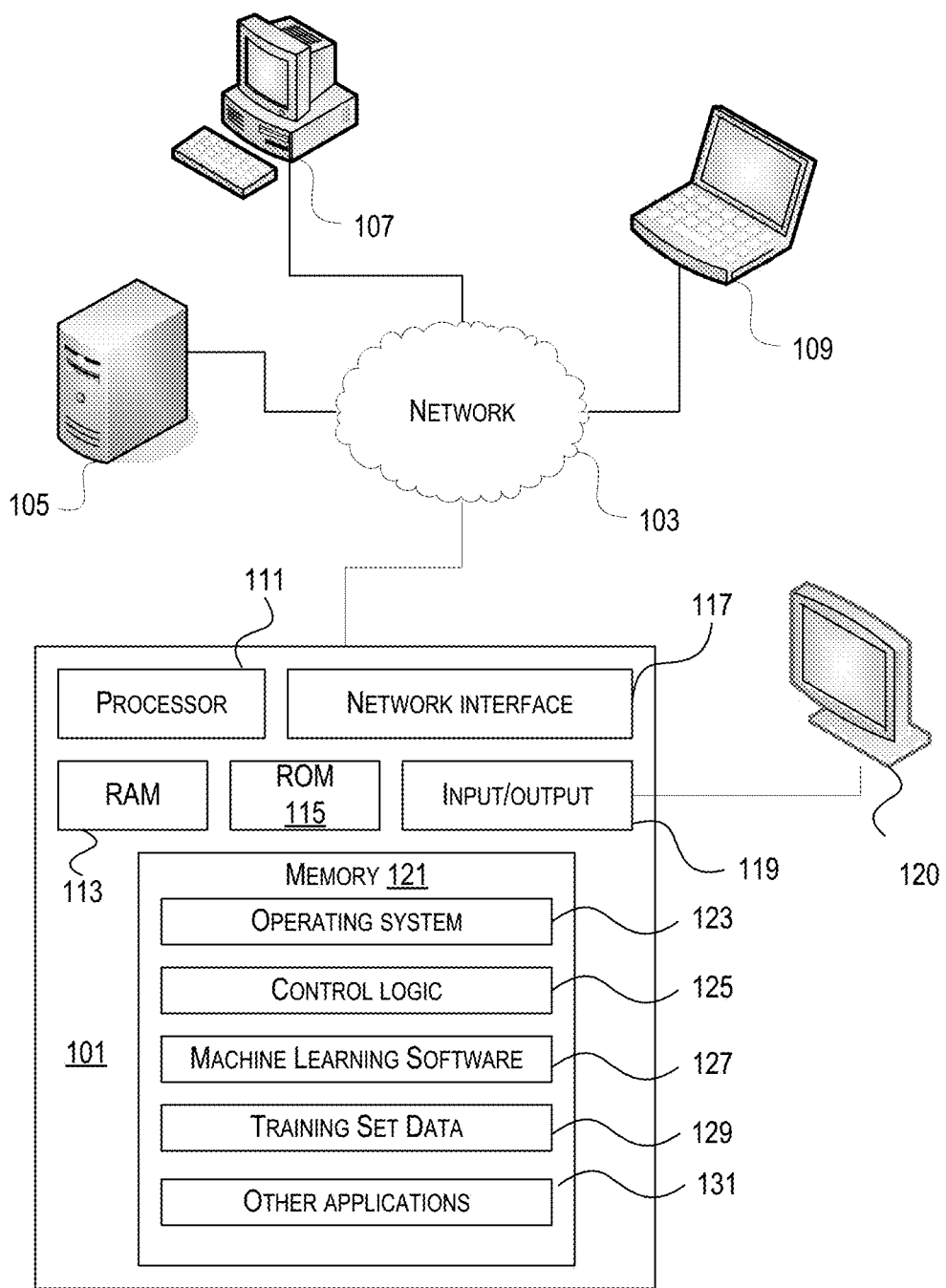
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the accuracy and fidelity of authentication questions that are generated based on, in whole or in part, transaction rules that were created by a user and indicate limitations on financial transactions that may be performed by an account. As discussed further herein, this combination of features may allow authentication questions to be generated in a manner which might be readily answered by a legitimate user, but which cannot be easily answered by a nefarious user.

As an example of the process described herein, a dieting user might set a transaction rule on their credit card that prevents them from spending money at candy stores. This limitation might have been set by the user using, for example, a financial account website. At some later time, the user might try to log-in to the financial account website. A computing device might generate an authentication question that indicates a violation of the aforementioned transaction rule. For example, the authentication question might ask the user: "Did you spend $30 at a candy store last Wednesday?" The user might be prompted to answer in the affirmative or in the negative. In this manner, a legitimate user might readily recognize that this question violates their transaction rule and respond in the negative, whereas a nefarious user might not be so readily capable of answering the question.

Aspects described herein improve the functioning of computers by improving the accuracy and security of computer-implemented authentication processes. The steps described herein relate to the authentication of users of computing devices, and in particular improving the manner in which computing devices generate and present authentication questions using data indicative of financial transaction limitations. By improving the fidelity and security of such authentication processes, users might be more readily provided legitimate access to computing resources, while unauthorized actors might be better prevented from gaining access to those same computing resources. Such processes could not be performed by a human being alone, as they focus on computer-implemented authentication and using multiple sources of digital data (e.g., transaction databases, transaction rules databases) to lower the possibility of user confusion. This can, in many ways, save computing resources: for instance, by improving the accuracy and clarify of authentication processes, computing devices might be less likely to inadvertently block legitimate attempts to access computing resources.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
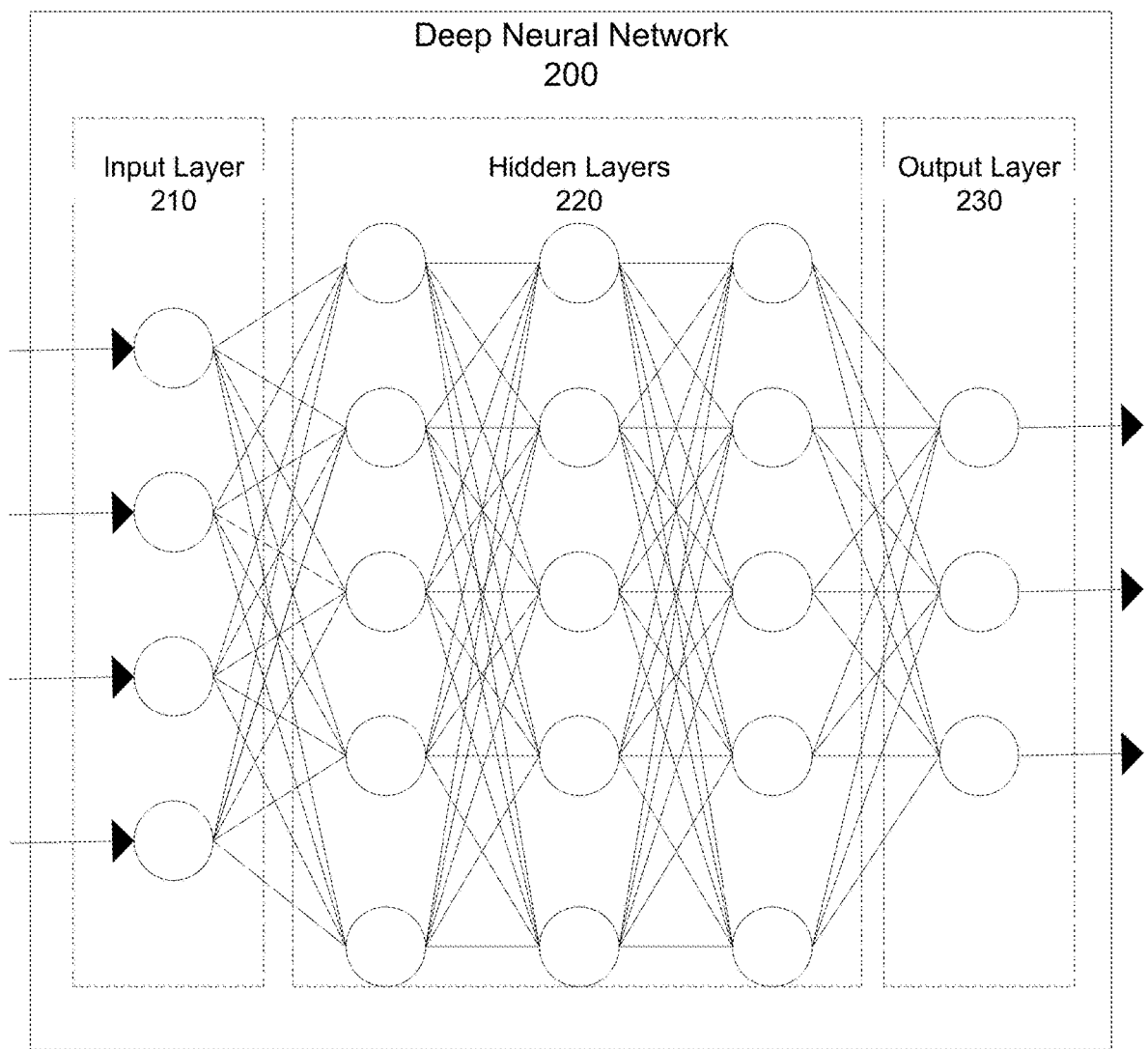
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
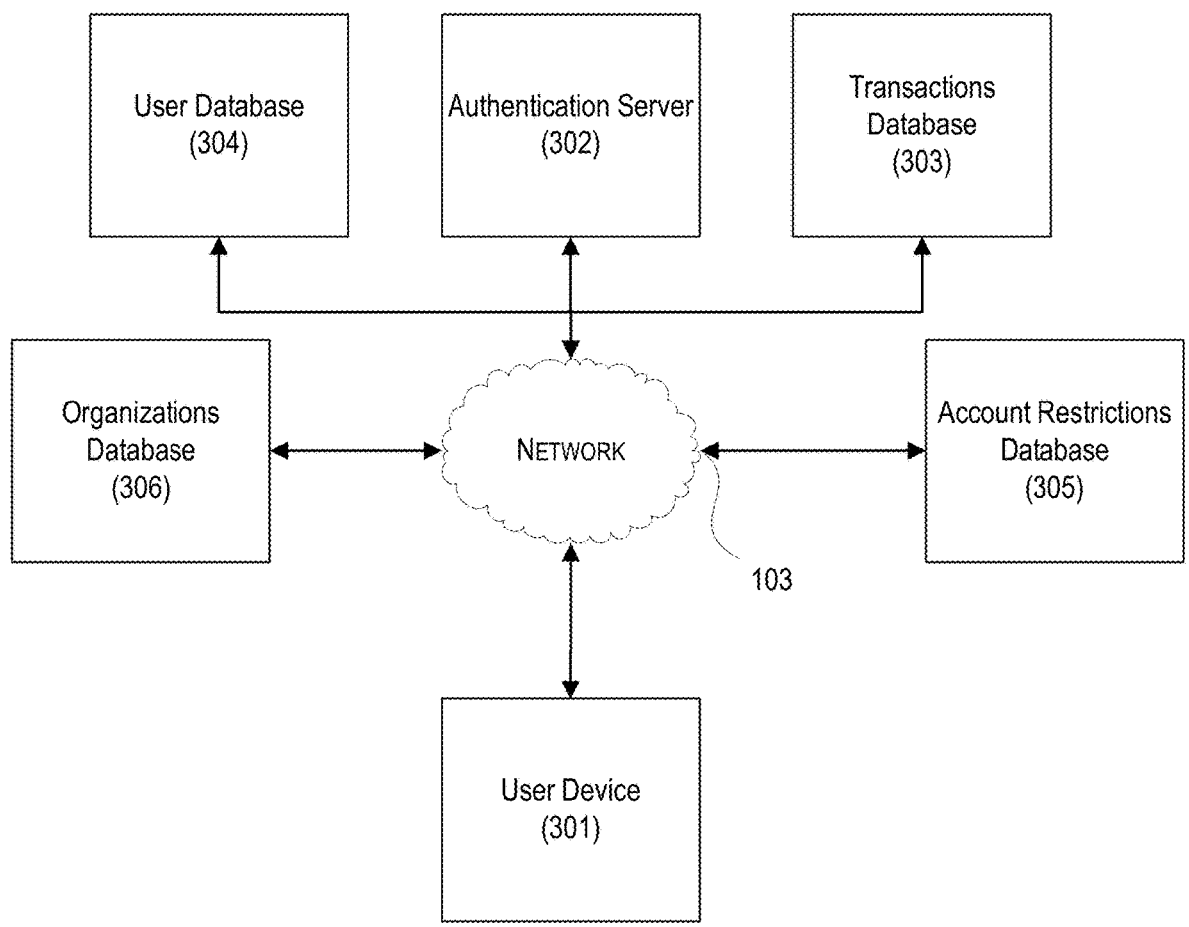
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user database 304, an account restrictions database 305, and an organizations database 306. The network 103 may be the same or similar as the network 103 of FIG. 1. Each of the user device 301, the authentication server 302, the transactions database 303, the user database 304, the account restrictions database 305, and/or the organizations database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). For example, the user device 301 might access a website or user interface associated with the authentication server 302. The authentication server 302 may then prompt (e.g., via a user interface) the user device 301 to answer one or more authentication questions. These questions might relate to a username, a password, a user PIN, or the like. In the case of questions relating to a username, a password, or the like, the questions might be generated based on data stored by the user database 304. Such authentication questions might additionally and/or alternatively relate to one or more transactions, such as one or more transactions conducted by a user or one or more synthetic transactions generated by a computing device. Such questions (e.g., those relating to one or more transactions conducted by a user) might be generated based on data stored by the transactions database 303 and/or data stored by the account restrictions database 305. Where an authentication question is premised on a transaction, a user might be prompted to identify whether the transaction is real (e.g., originates from the transactions database 303) and/or synthetic (e.g., is a synthetic transaction, generated by a computing device, that indicates a violation of a transaction rule stored by the account restrictions database 305). For example, the organizations database 306 might store a long list of random merchants, and the authentication question might, based on the list of random merchants and data stored by the account restrictions database 305, ask a user whether they conducted a synthetic transaction at a particular merchant of the list of random merchants that indicates a violation of a transaction rule. Based on the answers provided by a user of the user device 301, the user might be provided access (to, e.g., a user account).

The user database 304 might store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user database 304. The authentication server 302 might use this data to generate authentication questions. The user database 304 might store demographic data about a user, such as their age, gender, location, occupation, education level, income level, and/or the like. The user database 304 might additionally and/or alternatively store preferences for one or more user accounts relating to authentication. For example, the user database 304 might store preferences indicating that certain users are required to use two-factor authentication as part of authentication.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account.

The account data stored by the user database 304 and the transactions database 303 may, but need not be related. For example, the account data stored by the user database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The account restrictions database 305 may comprise data indicating one or more transaction rules for an account. A transaction rule may indicate limitations on financial transactions that may be performed via an account. Such limitations might relate to locations where money is permitted to be spent (e.g., a merchant, a geographical location), when money is permitted to be spent (e.g., certain hours of the day, certain months of the year), how money is permitted to be spent (e.g., which items are permitted to be purchased), and/or the like. A transaction rule might be limited to a single transaction (e.g., an upcoming and very expensive transaction), a type of transaction (e.g., restaurant purchases), or the like. As such, a transaction rule might relate to any limitation on one or more financial transactions that may be performed via one or more financial accounts. A transaction rule may be created a user. For example, a user might, via a user interface associated with a financial account, add, modify, or delete one or more transaction rules for the financial account. In this manner, a user might establish transaction rules as desired and for as long as desired. For example, before loaning a credit card to their child, a parent might use their smartphone to, via a banking application, create a transaction rule that limits purchases to no greater than ten dollars. As another example, before going out for a night on the town, a customer might use their computer to specify, via a banking website, that their credit card can be used for transactions no greater than two hundred dollars. In both circumstances, the customer(s) might later delete the transaction rule(s) after a period of time.

Transaction rules may serve a number of advantages, primarily in terms of helping users control their spending and protecting financial accounts from fraud. A transaction rule may advantageously allow a user to prevent themselves from spending money in undesirable ways. For example, a customer on a diet might configure a transaction rule that prevents them from using their financial accounts to purchase fast food. As another example, a customer might prohibit their financial accounts from being used to purchase virtual items in video games, as doing so may help protect the user from being pressured (e.g., by the video game) to purchase those items. At the same time, transaction rules might protect financial accounts from fraud. For example, a transaction rule preventing a credit card from being used outside a geographical area might protect a user because, if the card is stolen, thieves might not be able to use the card in a foreign country.

The organizations database 306 might store data relating to one or more organizations, including indications (e.g., names) of organizations, aliases of the organizations, and the like. That data might be used to generate authentication questions that comprise both correct answers (e.g., based on data from the transactions database 303 indicating one or more organizations where a user has conducted a transaction) and synthetic transactions (e.g., based on data from the organizations database 306, which might be randomly-selected organizations where a user has not conducted a transaction and which might indicate violations of a transaction rule). For example, a computing device might generate a synthetic transaction by querying the organizations database 306 for a list of organizations, then removing, from that list, organizations represented in the data stored by the transactions database 303.

Figure 4A:
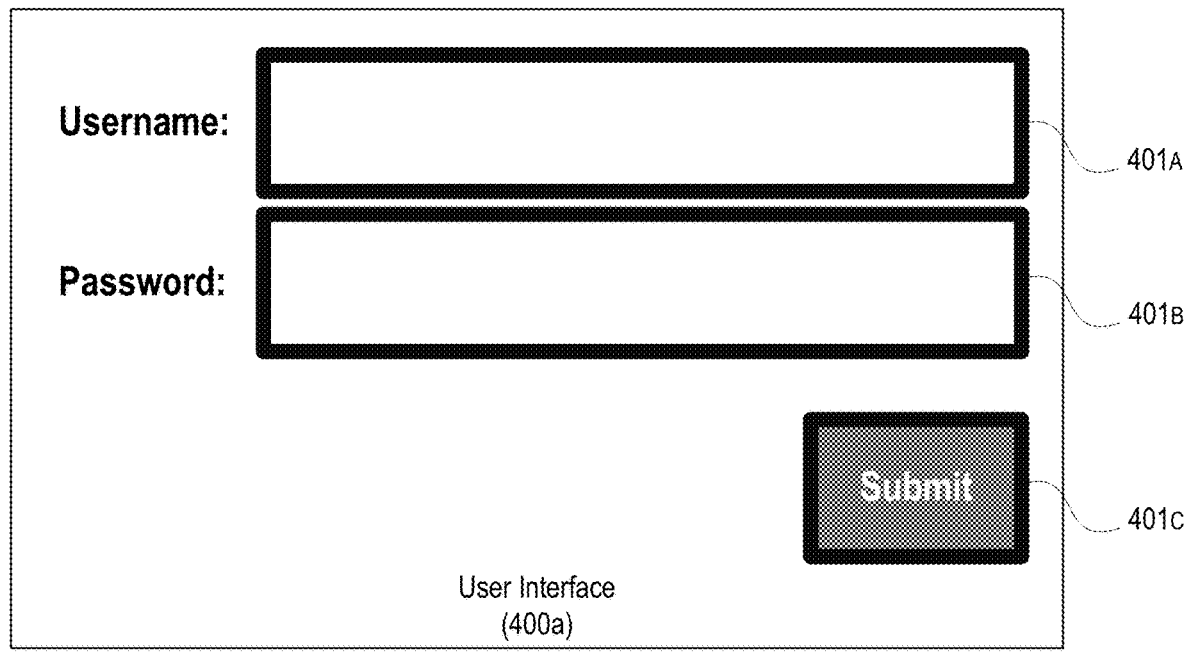
FIG. 4A depicts a user interface for authenticating access, by a user, to a financial account using a username and password.

FIG. 4A depicts an illustrative user interface 400*a* comprising a username field 401*a*, a password field 401*b*, and a submit button 401*c*. The user interface 400*a* might be provided by, e.g., the authentication server 302 as part of determining, using data stored by the user database 304, whether to provide the user device 301 access to an account. For example, a user might be prompted to type in a candidate username into the username field 401*a* and a candidate password into the password field 401*b*, and the user might be provided access to an account based on whether the candidate username and the candidate password match data stored by the user database 304. As such, the user interface 400*a* depicts a circumstance where a user is provided two different authentication questions: specifically, as shown in FIG. 4A, they are prompted to provide both a valid username and a valid password.

Figure 4B:
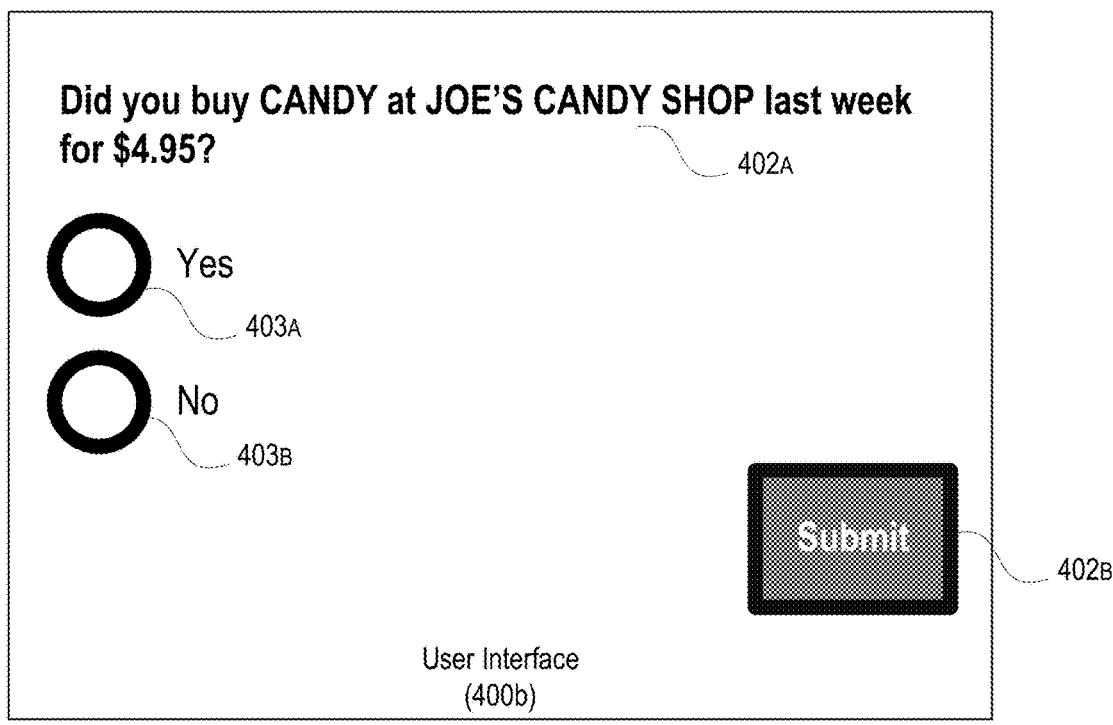
FIG. 4B depicts a user interface comprising an authentication question that has been generated based on a synthetic transaction that violates a transaction rule.

FIG. 4B depicts a user interface 400*b* comprising an authentication question 402*a* which allows a user to select one of a plurality of options 403*a*-403*b* and submit the selection using a submit button 402*b*. As previously discussed, an authentication question, such as the authentication question 402*a*, might be generated in a manner that indicates a violation of a transaction rule. For example, in the circumstance depicted in FIG. 4B, a user might have set a transaction rule that prevents them from using a financial account to conduct a transaction at a candy store. The plurality of options 403*a*-403*b* might comprise one or more correct answers and one or more incorrect answers. For example, in the example provided in FIG. 4B, the answer may be yes (option 403*a*) if the transaction is genuine (e.g., is reflected in the data stored by the transactions database 303) and may be no (option 403*b*) if the transaction is a synthetic transaction (e.g., was generated by a computing device, such as by using a randomly-selected organization from the organizations database 306 and/or based on one or more transaction rules indicated by the data stored in the account restrictions database 305).

FIG. 4B illustrates that authentication questions, such as the authentication question 402*a*, might be generated, in whole or in part, to indicate a violation of a transaction rule. As discussed above, the transaction inquired about by the authentication question 402*a* need not have ever occurred, and might in fact not be possible to conduct because it might be prohibited by one or more transaction rules (e.g., as indicated by data stored in the account restrictions database 305). In this way, a legitimate user might be able to identify that the authentication question 402*a* pertains to a synthetic transaction (that is, one that the user did not conduct), whereas an unauthorized user might not be able to so easily identify that the authentication question 402 pertains to a synthetic transaction.

Having discussed several examples of computing devices and user interfaces which may be used to implement some aspects as discussed further below, discussion will now turn to a method for generating authentication questions that indicate a violation of one or more transaction rules.

Figure 5:
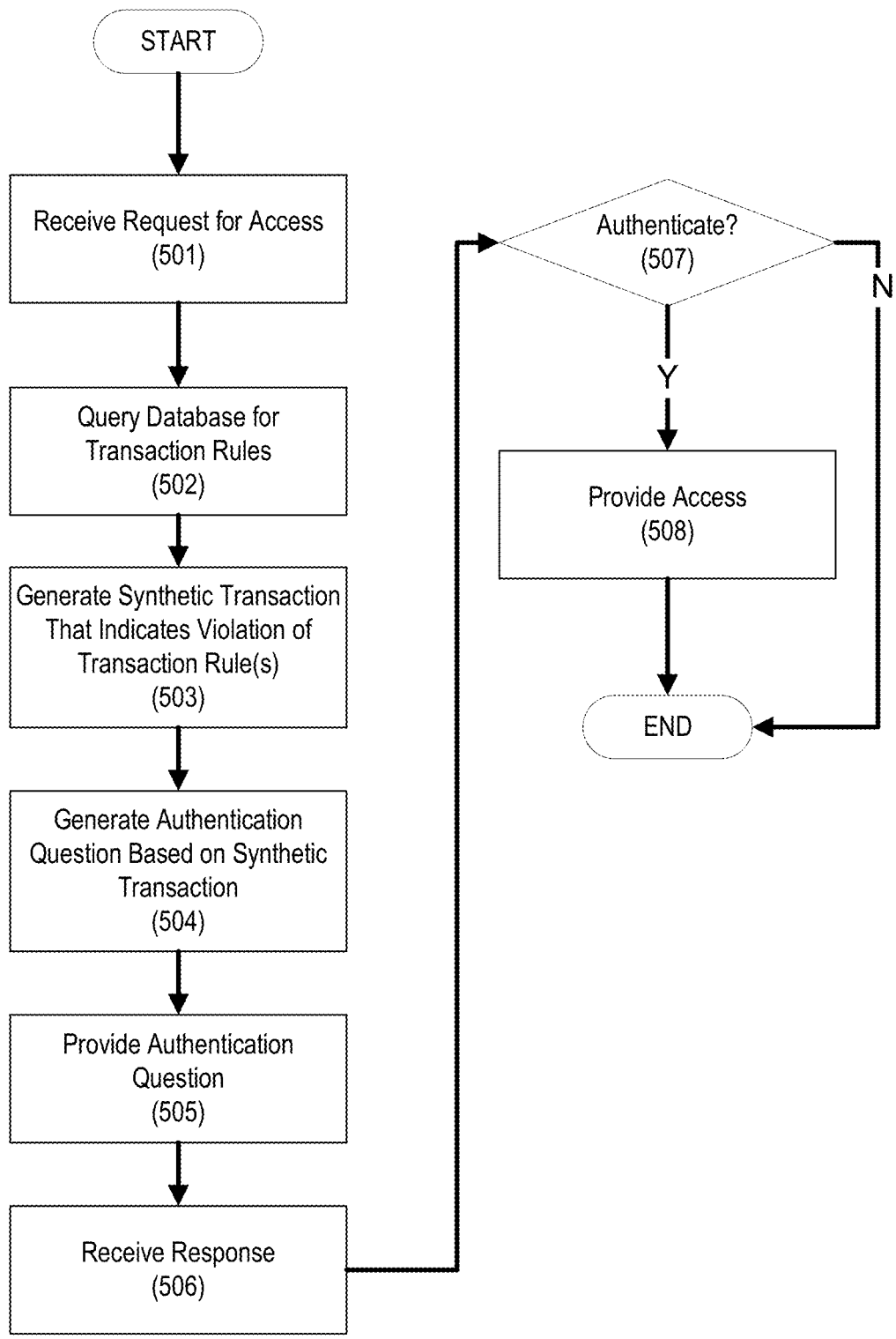
FIG. 5 shows a flow chart for a method of generating an authentication question based on a synthetic transaction that violates a transaction rule.

FIG. 5 illustrates an example method 500 for generating authentication questions in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The steps shown in the method 500 are illustrative, and may be re-arranged or otherwise modified as desired.

In step 501, a computing device might receive a request for access. The request for access might be for an account associated with a user. The request for access might be associated with a user accessing, via a user device, a website, a log-in screen, or the like. The request or access might comprise a request for access to an account, such as a financial services account, a banking account, or the like. The request for access might comprise, for instance, a user clicking a "Log In" button on a website. With that said, the request for access need not originate in any particular format or manner. The request for access to the account may comprise authentication credentials, such as a username, a password, or the like.

In step 502, the computing device may query a database (e.g., the account restrictions database 305) to determine one or more transaction rules associated with the account. The one or more transaction rules might indicate a limitation on one or more transactions which may be conducted via the account. For example, a transaction rule might prevent a user from conducting transactions during a particular period of time, at one or more merchants (or a category of merchants), of a particular amount (e.g., over one hundred dollars), or the like. The one or more transaction rules might be indicated in data in a variety of formats. For example, the transaction rules might be data comprising a list of prohibited merchants, a range of times when the account may be used, a dollar value range for different categories of merchants indicating amounts which may be spent at those different merchants, and/or the like.

The one or more transaction rules might indicate one or more prohibitions for an account. A prohibition may prevent the account from being used to conduct a particular type of transaction. For example, the account may be prohibited from conducting a transaction at a vendor. As another example, the account may be prohibited from conducting a transaction during a time period. Such a prohibition may operate to cause potential transactions to be rejected. For example, a prohibition may prevent a credit and/or debit card from being used at a point-of-sale system at a particular merchant if, for example, the merchant is prohibited, the amount in question is prohibited, the transaction is being conducted at a prohibited time, or the like.

Determining the one or more transaction rules may entail use of a machine learning model (e.g., one executing on all or portions of the deep neural network architecture 200) to determine simulated transaction rules. In some instances, a user might conduct transactions in a manner that follow a rule, even if such a rule has not been set by a user. For example, a user might never conduct transactions in the evening, but might not create an explicit rule that prohibits transactions in the evening. Also, users in a particular demographic might have certain transaction rules, but a certain user in that demographic might not have in fact provided such a rule for their account. To account for these circumstances, simulated transaction rules may be based on the metadata corresponding to an account. A machine learning model may be trained based on a plurality of different accounts. For example, the plurality of different accounts might be a selection of accounts with a financial institution, such as accounts similar to the account referenced in step 501. Based on determining that a quantity of the one or more transaction rules satisfy a threshold (e.g., there are no transaction rules, or that there are fewer than a predetermined number of transaction rules), a computing device may provide, as input to a trained machine learning model, metadata corresponding to the account. Such metadata corresponding to the account might originate from the user database 304 and might comprise, for example, user demographics (e.g., age, gender, location, income, occupation). The computing device might additionally and/or alternatively provide, as input to the trained machine learning model, the transaction rules (if any exist) corresponding to the account. The computing device may receive, as output from the trained machine learning model and based on the input, one or more simulated transaction rules. The simulated transaction rules might thereby reflect a likely transaction rule for a user (e.g., that the customer never shops at night), even if the user did not manually establish such a rule.

Determining the one or more transaction rules may entail use of a machine learning model (e.g., one executing on all or portions of the deep neural network architecture 200) to determine additional transaction rules. Additional transaction rules might be predicted based on existing transaction rules. For example, if a user specifies a transaction rule that disallows alcohol purchases at merchants in their local city, it might be the case that the user would disallow alcohol purchases at merchants in a nearby town as well, such that a transaction rule to that effect might be predicted. This may advantageously ensure that users need not be overly specific with their transaction rules: after all, a user might not wish to spend the time to manually enter in transaction rules for each and every location where they might shop. A machine learning model may be trained based on a plurality of different transaction rules, such as groups of transaction rules. Those groups of transaction rules might be for a variety of different accounts. A computing device may provide, as input to a trained machine learning model, one or more transaction rules for a particular account. For example, the computing device might provide, as input to the trained machine learning model, transaction rules received based on querying the account restrictions database 305. The computing device may then receive, as output from the trained machine learning model and based on the input, additional transaction rules. These additional transaction rules need not be identical to or similar to the real transaction rules for an account (e.g., as stored in the account restrictions database), but might reflect rules which might be, for instance, inferred from those real transaction rules.

In step 503, the computing device may generate a synthetic transaction. The synthetic transaction may be configured to be a transaction that has not, in fact, been conducted by a user of the account. The synthetic transaction might be generated in a manner such that the synthetic transaction is notably different than real transactions, conducted by the user, indicated in the transactions database 303. For example, a synthetic transaction might relate to a randomly-selected merchant (e.g., from the organizations database 306) that is not involved in any of the transactions indicated by the transactions database 303. In this manner, the synthetic transaction might reflect a transaction which may be identified by a user as fake (that is, as not actually conducted by the user). After all, if the synthetic transaction is too similar to a real transaction indicated in the transactions database 303, the user might mistakenly believe that they did, in fact, conduct the transaction.

The synthetic transaction may be generated to indicate a violation of one or more transaction rules of the transaction rules determined in step 502. For a transaction rule that indicates a prohibition of a certain type of transaction (e.g., at a category of merchant, at a particular merchant, involving currency exceeding a particular threshold value), a synthetic transaction might be generated to indicate that a transaction of the certain type occurred (e.g., a transaction at a merchant in the category of merchant, a transaction at the particular merchant, a transaction involving currency exceeding the particular threshold value, or the like). In this manner, the synthetic transaction might be readily identified by a legitimate user to be in violation of one or more transaction rules.

The synthetic transaction may be configured to be similar to, but not identical to, one or more past transactions indicated by account data stored by the transactions database 303. Though it may be desirable to avoid confusing the user by making a synthetic transaction too similar to a real transaction (e.g., as indicated by the data stored in the transactions database 303), it might nonetheless be valuable to ensure that the synthetic transaction conducted by the user emulates their spending sufficiently such that an unauthorized user cannot guess an authentication question. For instance, it might be undesirable to generate a synthetic transaction relating to a store in Japan for a user located in New York, as, when used as part of an authentication question, it might be easy for an unauthorized user to recognize that this transaction is synthetic and not genuine. As such, the computing device might determine a spending pattern and/or other demographic data associated with a user and, based on that spending pattern and/or demographic data, generate the synthetic transaction. For example, the synthetic transaction might be generated based on the age of a user, the location of the user, whether or not the user has a spouse and/or child, whether or not the user often goes out to eat, whether or not the user often shops at big box stores, or the like. The spending pattern might be based on transactions stored by the transactions database 303 and/or the account restrictions database 305. The demographic data for a user might be stored in the user database 304.

Generating a synthetic transaction may comprise identifying a real merchant that is different from merchants involved in transactions indicated by the data stored by the transactions database 303. A computing device might query the organizations database 306 to determine a plurality of merchants which might be used to generate a synthetic transaction. By querying the organizations database 306 to determine one or more merchants that might be used as part of generating a synthetic transaction, the synthetic transaction might use a real merchant, rather than an invented merchant, thereby improving the believability of the synthetic transaction. The computing device might additionally and/or alternatively remove, from that plurality of merchants, merchants represented in data stored by the transactions database 303. In this manner, the remaining merchants in the plurality of merchants are less likely to be merchants where the user has, in fact, conducted a transaction. This may ultimately improve the strength of the authentication question by preventing the computing device from inadvertently generating an authentication question premised on a synthetic transaction involving a merchant where the user has in fact conducted a transaction.

Generating the synthetic transaction may further be based on a pattern of transactions conducted by the first account or the second account. Data stored by the transactions database 303 might indicate a pattern of transactions conducted by a user. For example, the user might always purchase coffee in the morning, go to a particular lunch spot every weekday afternoon, and the like. This information might be used to generate synthetic questions which are easily detected by a legitimate user but which appear even more realistic to an unauthorized user. For example, the computing device might detect, based on the data stored by the transactions database 303, that a user always buys a coffee in the morning on weekdays. Based on that pattern of transactions, the computing device might generate a synthetic transaction showing that the user purchased a coffee in the morning on Saturday. While this purchase might look otherwise legitimate to an unauthorized user (and might thereby prevent them from gaining unauthorized access to an account), the legitimate user might easily recognize that this transaction did not occur.

In step 504, the computing device may generate an authentication question. The authentication question may be based on the synthetic transaction generated in step 506. The authentication question might indicate a violation of one or more transaction rules, such as the transaction rules referenced with respect to step 502. For instance, the synthetic transaction generated in step 504 might indicate a violation of a transaction rule, and the authentication question may, in turn, ask a user to verify whether the synthetic transaction is genuine or not. The authentication question may prompt the user to identify whether a synthetic transaction is genuine, or might otherwise ask the user to correctly indicate that a synthetic transaction never occurred. For example, the authentication question might ask the user whether they conducted the synthetic transaction, as is depicted in the user interface 400b of FIG. 4B. Additionally and/or alternatively, the authentication question might ask the user to identify one or more genuine transactions from a list of genuine and synthetic transactions. For example, the authentication question might provide the user a list of four transactions (three synthetic, one genuine) and prompt the user to select, from the transactions, the genuine transaction. Additionally and/or alternatively, the authentication question might ask the user to either provide detail for a transaction or indicate it is synthetic. For example, the authentication question might ask a user to specify when they conducted a synthetic transaction, and the user might be prompted to either provide a day of the week (any of which would be an incorrect answer) or indicate that the transaction never occurred (the correct answer).

Generating the authentication question may be based on a transaction history associated with an account. A transaction history might be stored for a particular account in, for example, the transactions database 303. A transaction history might indicate a history of transactions conducted by the account, such as one or more purchases of goods and/or services at one or more merchants. A transaction history may indicate patterns of spending of a user, such as when they shop at particular merchants, how much they spend at a particular merchant or category of merchants, or the like. As such, the authentication question might be generated based on the transaction history in a manner that appears realistic given the user's transaction history, but which nonetheless would be recognized by the user as relating to a synthetic transaction. For example, if the transaction history indicates that a user frequently shops at a coffee shop in the morning, and if a transaction rule specifies that a credit card can be used for purchases no greater than fifteen dollars, the authentication question might ask a user if they purchased a twenty-dollar meal at the coffee shop in the evening. In that example, the authentication question might be identified, by a legitimate user, to relate to a synthetic transaction in at least two ways: first, because the legitimate user does not shop at the coffee shop in the evening, and second, because the legitimate user does not permit the credit card to be used for twenty-dollar transactions.

Generating the authentication question may entail use of a machine learning model. A machine learning model may be trained based on a plurality of transaction rules and a plurality of questions based on those rules. For example, a machine learning model might be trained based on a history of questions generated based on various transaction rules. As another example, the machine learning model might be provided a list of example questions along with various transaction rules which might correspond to those questions. In this manner, the machine learning model might learn how to formulate believable authentication questions which can nonetheless be recognized by a legitimate user as pertaining to a synthetic transaction. The computing device may provide, as input to a trained machine learning model, the one or more transaction rules. For example, the computing device might provide one or more transaction rules determined in step 502. The computing device may receive, as output from the trained machine learning model and based on the input, an authentication question. As such, the machine learning model might be configured to generate an authentication question based on transaction rules for an account.

Generating the authentication question may be based on accounts similar to the account for which access is requested in step 501. A computing device may query, using metadata corresponding to an account, an accounts database (e.g., the user database 304) to determine one or more second accounts similar to the account. Such a query might be based on demographic information associated with the user. For example, the user database 304 might be queried based on the age, location, and gender of the user to identify one or more other similar users (and, in turn, their accounts). Generating the authentication question may be based on historical transactions associated with the one or more second accounts. For example, even if transaction data for a particular user has no transaction data (e.g., because the account is very new), users in a particular demographic (e.g., single women in their thirties) might rarely shop at a golf store, but that same demographic might frequent local wineries. In such a circumstance, it might be advantageous to generate an authentication question for the particular user that pertains to the local wineries, but not golf stores. After all, should the authentication question pertain to golf stores, the answer (that is, that the user did not shop at the golf store) might be more readily guessed by an unauthorized user.

In step 505, the computing device may provide the authentication question to, e.g., a user device. Providing the authentication question may comprise causing display of the authentication question in a user interface, such as on a website.

In step 506, the computing device may receive a response to the authentication question. The response to the authentication question may be received from a user device. The answer might be a selection of a radio option, a written response in a text box, or the like. The response need not be in any particular format.

In step 507, the computing device may determine, based on the response received in step 506, whether to authenticate the request for access. Determining whether to authenticate the request for access might be based on whether the user correctly answered the question generated in step 505. If the computing device decides to authenticate the request, the method 500 proceeds to step 508. Otherwise, the method 500 ends.

Providing a user device access to an account may be based on authentication of authentication credentials received as part of a request for access. As indicated above with respect to step 501, the request for access may comprise authentication credentials, such as a username, a password, a two-factor authentication code, or the like. Thus, step 507 might be based both on the validity of the proffered authentication credentials, but also on whether the user correctly answered the question generated in step 505.

In step 508, based on determining to authenticate the request for access in step 507, access to an account may be provided. Providing access to the account might comprise providing a user (via, e.g., their user device) access to a protected part of a website, to encrypted data, or the like.

FIG. 6A illustrates data that might be stored by the organizations database 306, the transactions database 303, and the account restrictions database 305. The data shown in these databases are merely illustrative, and show (in conjunction with FIG. 6B and FIG. 6C) how a synthetic transaction and authentication question might be generated based on transaction rules. The organizations database 306 may store a list of a variety of popular organizations (e.g., Stores A-E, as shown in FIG. 6A), such as stores that customers in a particular region frequent. The transactions database 303 shown in FIG. 6A indicates that a user has recently shopped at Store A and Store E. The account restrictions database 305 shown in FIG. 6A contains data comprising a rule that specifies that a particular account is prohibited from being used for transactions over one hundred dollars. The account restrictions database 305 shown in FIG. 6A contains data comprising a rule that specifies that a particular account is prohibited from purchasing coffee.

FIG. 6B illustrates a list of synthetic transaction options 601. The synthetic transaction options 601 shown in FIG. 6B may comprise stores that are indicated in the organizations database 306 of FIG. 6A, but which are not indicated in the transactions database 303. In other words, the synthetic transaction options 601 may comprise a list of stores where the user is predicted to not have conducted any transactions. The synthetic transaction options 601 might additionally and/or alternatively comprise one or more transaction rules from the transaction rules database 305. For example, as shown in FIG. 6B, either or both the "No Transactions Over $100" and "No Coffee Purchases" rules may be used to generate a synthetic transaction. In other words, the synthetic transaction options 601 depict various options of stores and transaction rules based on which a synthetic transaction may be generated.

FIG. 6C illustrates an authentication question, in a user interface 603, that has been generated based on the synthetic transaction options 601 of FIG. 6B. The user interface 602 may permit a user to indicate whether or not they conducted the synthetic transaction. In the example shown in FIG. 6B, the correct answer may be "No," as the authentication question has been premised on a synthetic transaction that indicates a violation of the "No Transactions Over $100" rule. That said, in previous and/or subsequent questions, the user might be asked about legitimate questions as well: for example, the user might be provided a series of authentication questions based on genuine and synthetic transactions, where the user is prompted to identify, for each transaction, whether it is legitimate or synthetic.

Discussion will now turn to various ways in which transition rules might be created. As discussed above, the presence of transaction rules (e.g., as stored in data in the account restrictions database 305) may advantageously allow for the generation of better authentication questions based on synthetic transactions that violate those transaction rules. That said, users might be hesitant to impose transaction rules on their account, particularly because the process might be seen as limiting their ability to freely spend money. As such, various processes may be performed to encourage the creation of transaction rules which ultimately improve the quality of authentication questions and improve the safety of the user's financial account.

Figure 7:
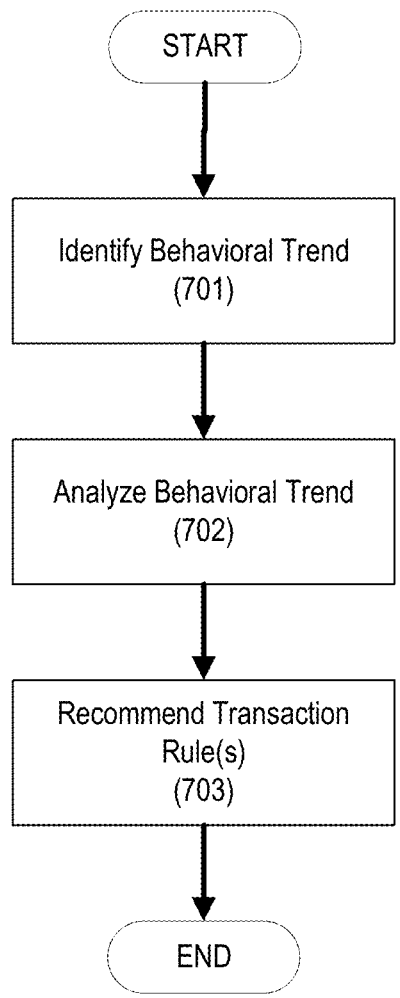
FIG. 7 shows a flow chart for a method of recommending transaction rules.

FIG. 7 illustrates an example method 700 for recommending transaction rules in accordance with one or more aspects described herein. The method 700 may be implemented by a suitable computing system, as described further herein. For example, the method 700 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 7. The method 700 may be implemented in suitable program instructions, such as in machine learning software 127, and may operate on a suitable training set, such as training set data 129. The steps shown in the method 700 are illustrative, and may be re-arranged or otherwise modified as desired.

In step 701, a computing device may identify a behavioral trend for a user. The behavioral trend may relate to one or more ways in which the user conducts transactions. A behavioral trend might relate to when the user shops (e.g., in physical stores or online), where a user likes to shop (e.g., luxury stores, discount stores, dine-in restaurants, take-out restaurants), what a user likes to purchase (e.g., large quantities of cheap items, small quantities of expensive items), where a user likes to shop (e.g., at a particular shopping center, on particular websites), or the like. Such a behavioral trend might be determined by processing data stored by the transactions database 303 and/or the user database 304. For example, the behavioral trend might be based on a history of transactions conducted by a user over a period of time, as reflected in data stored by the transactions database 303. Additionally and/or alternatively, the behavioral trend might be identified by monitoring user activity. For example, a user might install a web browser plug-in which monitors their shopping habits and provides discounts for certain online stores, and monitoring data from that plug-in might be used to determine a behavioral trend for the user. As another example, a user might install an application on their smartphone that, with their permission, monitors their geographical location within a store, and those geographical locations might be used to infer behavioral trends of the user (e.g., where the user likes to shop, which aisles the user likes to shop in, or the like).

In step 702, the computing device may analyze the behavioral trend. Analyzing the behavioral trend may comprise processing the behavioral trend to determine locations, time periods, and/or types of transactions which are not conducted by the user. For example, if the behavioral trend indicates that the user always shops at a particular store in the morning, then it may be inferred that the user never shops at the particular store in the evening. As another example, if the behavioral trend indicates that the user regularly uses a credit card to conduct small transactions, then it might be inferred that the credit card should not be used for transactions exceeding ten thousand dollars.

In step 703, the computing device might recommend one or more transaction rules based on the analyzed behavioral trend. This may comprise providing, in a user interface, a selectable option to add the transaction rule to the transactions database 303 in a manner which associates it with an account of the user. In this way, a user need not manually configure a transaction rule, but might instead be provided a convenient way to add a transaction rule to their account, further securing their account. This has multiple benefits for the user: it not only allows subsequent authentication questions to be stronger, but might protect their account in the event that it is compromised. For example, a transaction rule that prohibits transactions of over $100 might be useful to prevent abuse of a stolen credit card.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from a user device, a request for access to an account associated with a user;
   based on determining that a quantity of one or more user-created transaction rules satisfy a threshold, determining one or more simulated transaction rules for the account by:
      providing, as input to a trained machine learning model, metadata corresponding to the account, wherein the trained machine learning model is trained based on a plurality of different accounts; and
      receiving, as output from the trained machine learning model and based on the input, the one or more simulated transaction rules, wherein the simulated one or more transaction rules indicate limitations on financial transactions that may be performed via the account; and
   providing the user device access to the account based on a response to an authentication question that indicates a violation of the one or more simulated transaction rules.

2. The method of claim 1, further comprising:
   generating the authentication question; and
   providing the authentication question to the user device.

3. The method of claim 1, wherein a first quantity of the one or more simulated transaction rules is greater than a second quantity of the one or more user-created transaction rules.

4. The method of claim 1, wherein determining the one or more simulated transaction rules comprises:
   providing, as input to a second trained machine learning model, the one or more simulated transaction rules, wherein the second trained machine learning model is trained based on groups of transaction rules; and
   receiving, as output from the second trained machine learning model and based on the input, additional simulated transaction rules.

5. The method of claim 1, wherein the authentication question is based on historical transactions associated with one or more second accounts.

6. The method of claim 1, further comprising:
   based on the determining that the quantity of the one or more user-created transaction rules satisfy the threshold:
      processing a transaction history of the account to determine a behavioral trend; and
      causing output of a recommendation to create a new user-created transaction rule based on the behavioral trend.

7. The method of claim 1, wherein the authentication question is based on a transaction history associated with the account.

8. The method of claim 1, wherein the one or more simulated transaction rules indicate one or more of:
that the account is prohibited from conducting a transaction at a vendor; and
that the account is prohibited from conducting a transaction during a time period.

9. The method of claim 1, wherein the request for access to the account associated with the user comprises authentication credentials, and wherein providing the user device access to the account is further based on authenticating the authentication credentials.

10. A computing device comprising:
one or more processors; and
memory storing instructions that, when executed by the one or more processors, cause the computing device to:
receive, from a user device, a request for access to an account associated with a user;
based on determining that a quantity of one or more user-created transaction rules satisfy a threshold, determine one or more simulated transaction rules for the account by:
providing, as input to a trained machine learning model, metadata corresponding to the account, wherein the trained machine learning model is trained based on a plurality of different accounts; and
receiving, as output from the trained machine learning model and based on the input, the one or more simulated transaction rules, wherein the one or more simulated transaction rules indicate limitations on financial transactions that may be performed via the account; and
provide the user device access to the account based on a response to an authentication question that indicates a violation of the one or more simulated transaction rules.

11. The computing device of claim 10, wherein the instructions, when executed by the one or more processors, cause the computing device further to:
generate the authentication question; and
provide the authentication question to the user device.

12. The computing device of claim 10, wherein a first quantity of the one or more simulated transaction rules is greater than a second quantity of the one or more user-created transaction rules.

13. The computing device of claim 10, wherein the instructions, when executed by the one or more processors, cause the computing device to determine the one or more simulated transaction rules by causing the computing device to:
provide, as input to a second trained machine learning model, the one or more simulated transaction rules, wherein the second trained machine learning model is trained based on groups of transaction rules; and
receive, as output from the second trained machine learning model and based on the input, additional simulated transaction rules.

14. The computing device of claim 10, wherein the authentication question is based on historical transactions associated with the one or more second accounts.

15. The computing device of claim 10, wherein the instructions, when executed by the one or more processors, further cause the computing device to:
based on the determining that the quantity of the one or more user-created transaction rules satisfy the threshold:
process a transaction history of the account to determine a behavioral trend; and
cause output of a recommendation to create a new user-created transaction rule based on the behavioral trend.

16. One or more non-transitory computer-readable media storing instructions that, when executed by one or more processors, cause a computing device to:
receive, from a user device, a request for access to an account associated with a user;
based on determining that a quantity of one or more user-created transaction rules satisfy a threshold, determine one or more simulated transaction rules for the account by:
providing, as input to a trained machine learning model, metadata corresponding to the account, wherein the trained machine learning model is trained based on a plurality of different accounts; and
receiving, as output from the trained machine learning model and based on the input, the one or more simulated transaction rules, wherein the one or more simulated transaction rules indicate limitations on financial transactions that may be performed via the account; and
provide the user device access to the account based on a response to an authentication question that indicates a violation of the one or more simulated transaction rules.

17. The computer-readable media of claim 16, wherein the instructions, when executed by the one or more processors, cause the computing device to:
generate the authentication question; and
provide the authentication question to the user device.

18. The computer-readable media of claim 16, wherein a first quantity of the one or more simulated transaction rules is greater than a second quantity of the one or more user-created transaction rules.

19. The computer-readable media of claim 16, wherein the instructions, when executed by the one or more processors, cause the computing device to determine the one or more simulated transaction rules by causing the computing device to:
provide, as input to a second trained machine learning model, the one or more simulated transaction rules, wherein the second trained machine learning model is trained based on groups of transaction rules; and
receive, as output from the second trained machine learning model and based on the input, additional simulated transaction rules.

20. The computer-readable media of claim 16, wherein the authentication question is based on historical transactions associated with the one or more second accounts.

* * * * *